April 26, 1966 K. E. NEUMEIER 3,247,978
MANIPULATOR HAND
Filed Dec. 12, 1962 5 Sheets-Sheet 1
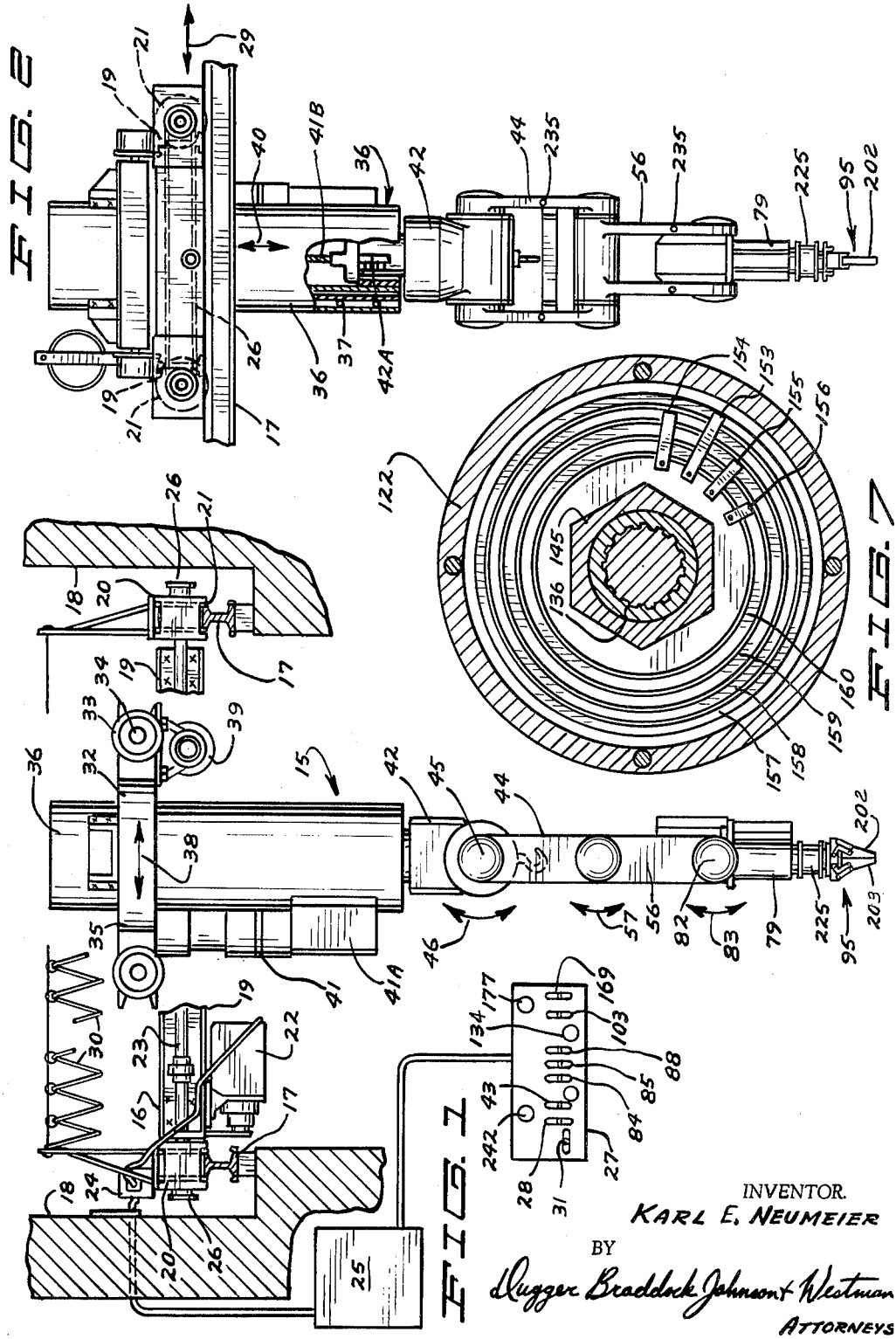
INVENTOR.
KARL E. NEUMEIER
BY
Dugger Braddock Johnson + Westman
ATTORNEYS April 26, 1966 K. E. NEUMEIER 3,247,978
MANIPULATOR HAND Filed Dec. 12, 1962 5 Sheets-Sheet 2

INVENTOR.
KARL E. NEUMEIER
BY
Dugger, Braddock, Johnson & Westman
ATTORNEYS

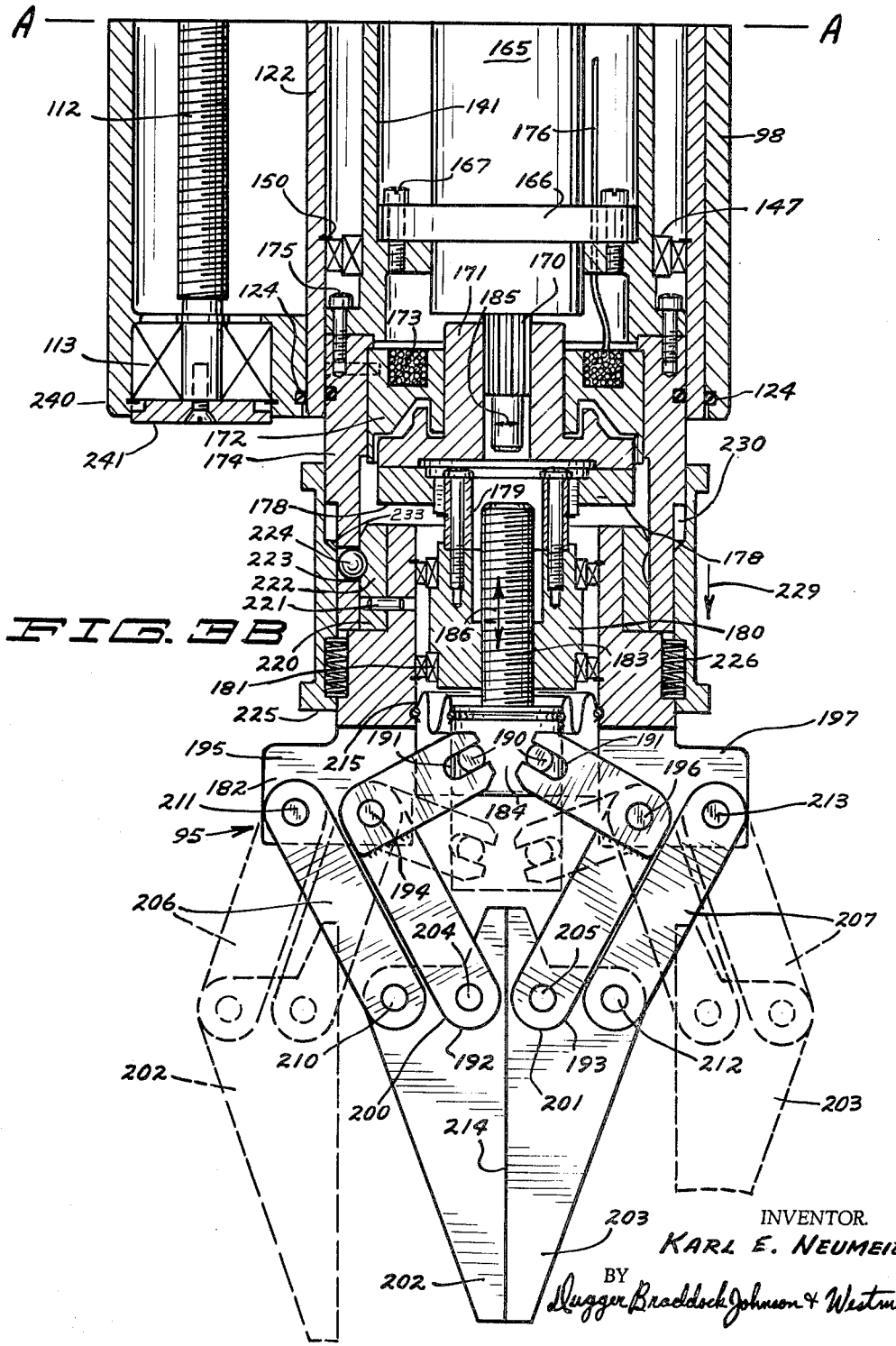

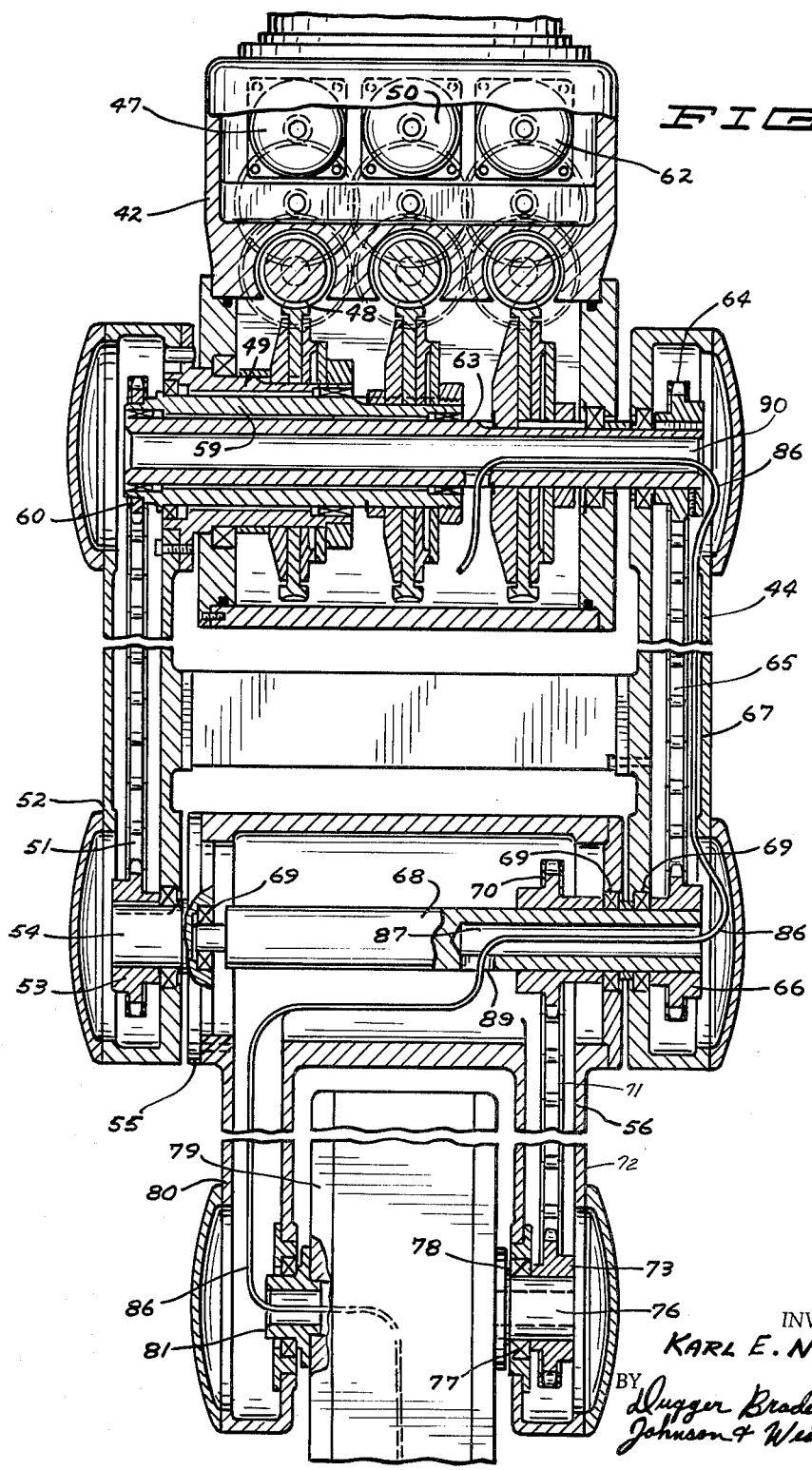

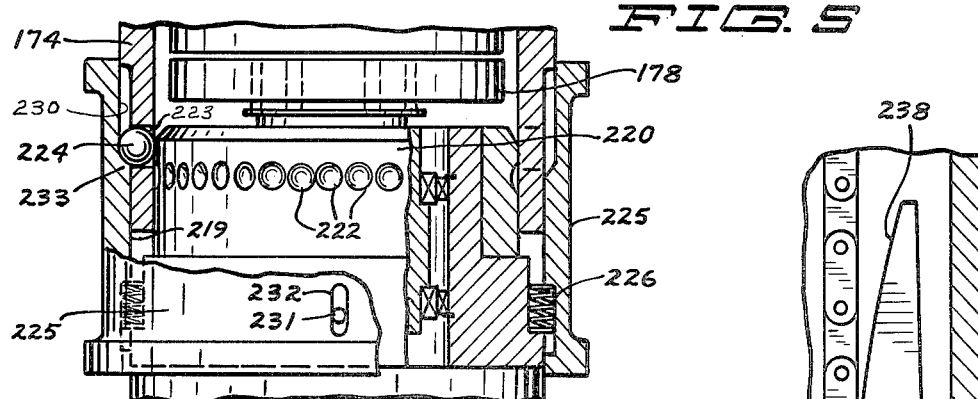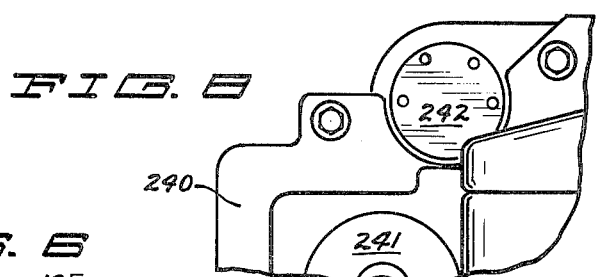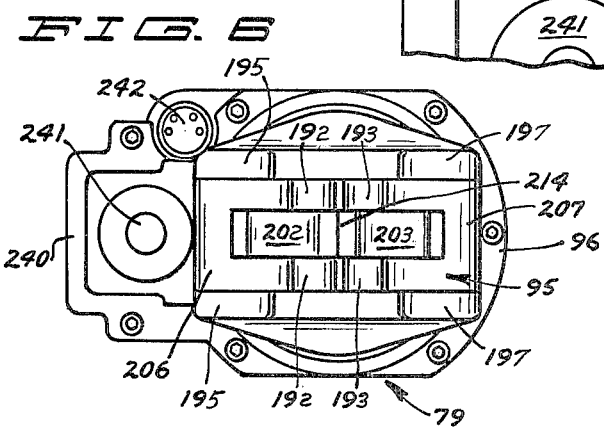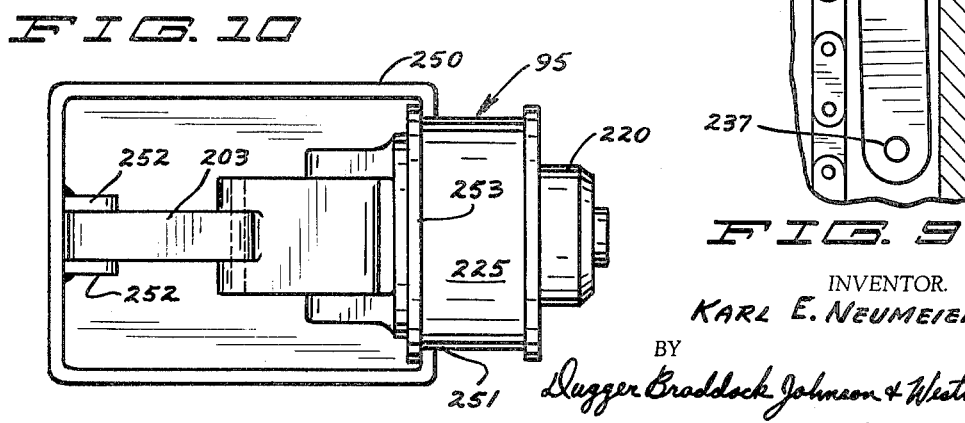

United States Patent Office 3,247,978
Patented Apr. 26, 1966

3,247,978
MANIPULATOR HAND
Karl E. Neumeier, Stillwater, Minn., assignor to Programmed & Remote Systems Corporation, St. Paul, Minn., a corporation of Minnesota
Filed Dec. 12, 1962, Ser. No. 244,148
17 Claims. (Cl. 214—1)

The present invention has relation to remote handling equipment and more particularly to a manipulator hand assembly.

Remote handling equipment is presently in wide use where materials must be handled in explosive or radioactive environment or under water. The function of any remote handling unit depends a great deal on the maneuverability and adaptability of the hand used on the equipment.

If the hand is not sufficiently motive or easily manipulated the unit is practically worthless. On equipment presently in use, the grip or hands have limited the adaptability of the manipulators.

The device of the present invention, in the form as disclosed, presents a manipulator which has a hand that is removable from the manipulator and also can be replaced onto the manipulator with a straight line motion. The grip can be supported on a change fixture, removed, and replaced remotely. In addition, the grip is designed so that the fingers of the grip will maintain their gripping force even with the hand removed from the manipulator. Several tools can be used interchangeably on the manipulator.

The hand is continuously rotatable without any adjustments in the position of the gripping jaws. Also, the hand may be moved axially with respect to the wrist assembly from an extended to a retracted position to further aid in maneuverability of the unit.

The hand can be removed and another type of tool installed remotely. The angular position between the hand and the mounting member or wrist assembly is not important, as the hand will attach to the wrist at any relative rotational position. Therefore, there is no need to obtain perfect alignment when installing tools which have been previously removed.

An electro-magnetic clutch is provided to control the amount of gripping force of the jaws. By moving the control for the clutch the amount of gripping force can be regulated.

It is an object of the present invention to present a manipulator utilizing a new type of manipulator hand.

It is a further object of the present invention to present a manipulator wherein the hand may be removed from or replaced on the manipulator by a straight line motion.

It is a further object of the present invention to present a manipulator hand that may be removed from the wrist assembly with an object held in the jaws.

It is a further object of the present invention to present a manipulator hand which is continuously rotatable in either direction without affecting the setting of the gripping jaws.

It is a still further object of the present invention to present a manipulator hand wherein the force exerted by the gripping jaws can be adjusted.

Other and further objects are those inherent in the invention herein illustrated, described, and claimed, and will become apparent as the description proceeds.

To the accomplishment of the foregoing and related ends, this invention then comprises features hereinafter fully described and particularly points out in the claims, the following description setting forth in detail certain illustrative embodiments of the invention, these being indicative, however of but a few of the various ways in which the principles of the invention may be employed.

The invention is illustrated by reference to the drawings in which corresponding numerals refer to the same parts, and in which:

FIG. 1 is a fragmentary front elevational view of a manipulator installation;

FIG. 2 is a side elevational view of the device of FIG. 1;

FIG. 3B is a lower portion of the manipulator wrist assembly made according to the present invention and associated with FIG. 3A along line A—A;

FIG. 4 is a fragmentary enlarged sectional view of a manipulator arm;

FIG. 5 is a fragmentary side elevational view of locking mechanism for holding a hand portion onto the wrist assembly and showing the hand portion partially removed, with parts in section and parts broken away;

FIG. 6 is an end elevational view of the hand and wrist assembly shown in FIGS. 3A and 3B;

FIG. 7 is a sectional view taken as on line 7—7 in FIG. 3A;

FIG. 8 is a fragmentary enlarged front elevational view of the wrist assembly showing an auxiliary tool receptacle;

FIG. 9 is a fragmentary enlarged sectional view of a manipulator arm showing a typical chain tightener bar; and FIG. 10 is a side elevational view of a change fixture showing a hand assembly removed from the manipulator.

Figure 3A:
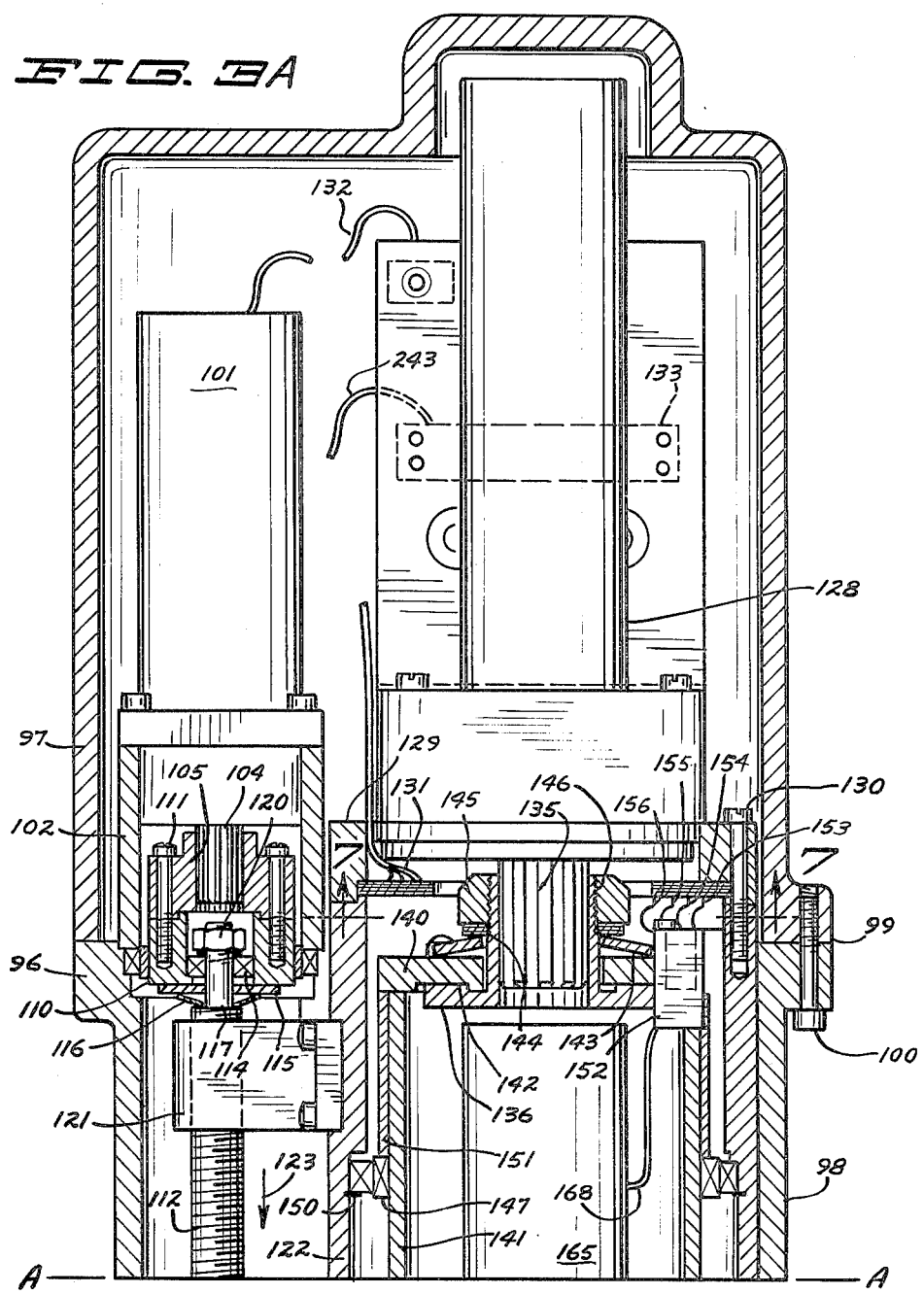
FIG. 3A is an upper portion of a manipulator wrist assembly made according to the present invention.

Referring to the drawings and the numerals of reference thereon, a manipulator illustrated generally at 15 is mounted on a bridge 16 which in turn is movable along tracks 17, 17 that are fastened to walls 18, 18 of a room in which the manipulator is to work.

The bridge 16 is composed of a pair of beams 19, 19 which are spaced apart and are joined together with end members 20, 20. Each of the end members has a pair of track follower wheels 21, 21 rotatably mounted thereon and adapted to ride on the tracks 17. The bridge is powered with an electric motor 22 which drives a shaft 23 that in turn is drivably attached to wheels 21 on opposite tracks 17. A chain and sprocket arrangement 26 is utilized to drive the set of wheels on the opposite side of the bridge.

The motor 22 is controlled remotely from position outside of the room in which the manipulator is working from a control box illustrated schematically at 27. A bridge control element 28 is utilized to control the motor 22. The motor is wired through a junction box 24 mounted on the bridge. The junction box is connected through a suitable wiring to a power center 25 which in turn is connected to the control box. The motor 22 is reversible through suitable switching means and by moving the control element 28 in the proper direction, the bridge will be moved in directions as indicated by double arrow 29 in FIG. 2. Thus the bridge is powered along the tracks 17 and the manipulator can be moved in these directions. The motor 22, as well as other motors in the manipulator run with direct current and the speed of rotation thereof is controlled through the control element also.

The manipulator carriage 32 is mounted between the beams 19, 19 of the bridge on suitable wheels 33. The wheels 33 are mounted on suitable shafts 34 which in turn are rotatably mounted in a framework 35. The framework 35 supports a main vertical telescoping support tube 36 for the manipulator. The wheels 33 ride along the beams 19 of the bridge. An electric motor 39 is utilized to drive the wheels 33 and move the carriage 32 along the beams of the bridge. A power cord 30 extends from junction box 24 and carries electric power to motor 39 and the rest of the motors mounted on the carriage. The cord 30 coils and uncoils as the carriage moves. A carriage control element 31 is included in the control box 27 and by moving the element 31 in suitable direction the carriage can be powered along the beams in directions as indicated by double arrow 38 in FIG. 1. Thus the manipulator is movable in two directions at right angles to each other through movement of the bridge and carriage.

The telescoping tube set 36 is composed of four nested tubes as shown fragmentarily in section in FIG. 2. The tubes have suitable rollers shown by way of example at 37 for guiding them as they move along the axis thereof. The tubes are adapted to move in directions as indicated by double arrow 40.

Vertical movement of the telescoping tube set is controlled through an electric motor 41 which operates through a winch 41A to control a cable 41B which is attached to the manipulator and serves to raise the manipulator under power. The motor and winch are fixed to the outer tube. The manipulator lowers under gravity force when the cable is lowered. The motor 41 is controlled through a switch operated by a control element 43 on the control box 27. The switch is reversible and by moving the control element of the switch in suitable direction the motor 41 will be powered to raise or lower the hoist. A suitable motor (not shown) is provided for continuously rotating a shoulder housing 42 with respect to the telescoping tubes about the axis of the tubes. The shoulder housing 42 is continuously rotatable in either direction of rotation. Power is carried past the continuously rotatable shoulder joint through a suitable brush block and slip ring connection 42A to motors in the shoulder portion 42 and other motors used to operate the hand and wrist assemblies.

As shown in FIG. 4, shoulder portion 42 houses suitable motors for driving the manipulator arm members. A first motor 47 drives spur reduction gears (illustrated in dotted lines) which in turn drive a worm gear set 48 that drives a shaft 49 directly connected to an upper arm assembly 44. Shaft 49 is concentrically mounted with two other shafts and rotatable with respect thereto. The other shafts drive the forearm and wrist assemblies of the manipulator. All three shafts are rotatably mounted about a pivotal axis 45 of the upper arm 44. The first motor 47 is controlled through a control element 84 on control box 27 which controls a suitable switch to energize the motor and in turn cause the upper arm 44 to pivot in directions as indicated by double arrow 46 about the axis 45 of the upper arm. Power is carried through the power cord 30 and the brush block and slip ring connection 42A.

A second motor 50 drives a second shaft 59 through suitable gearing as shown. The second shaft 59 is rotatably mounted on axis 45 of the upper arm. The second shaft 59 has a sprocket 60 drivably mounted at one end thereof which in turn drives a chain 51. The second motor 50 is controlled by a control element 85 in control box 27 which operates through a switch to operate the motor in either direction of rotation. The chain 51 extends through one of the side sections 52 of upper arm 44 and the chain is drivably mounted over a sprocket 53 which is in turn mounted on a stub shaft 54 that is connected to a web 55 which is drivably mounted onto a forearm assembly 56. Thus whenever the forearm pivot motor 50 is energized, chain 51 is driven and the forearm 56 will be pivoted about the axis of shaft 54. The forearm is movable in directions as indicated by double arrow 57 in FIG. 1.

A wrist pivot motor 62 is mounted in shoulder housing 42 and drives a shaft 63 through suitable gearing as shown. The wrist pivot shaft 63 is also rotatably mounted about axis 45 of the upper arm. Shaft 59 is rotatably mounted over shaft 63 and shaft 49 is rotatably mounted over shaft 59 and 63. The three shafts are independently powered and independently movable, each driving a separate arm member.

The wrist pivot shaft 63 has a sprocket 64 mounted thereon at the outer end thereof. The sprocket 64 drives a chain 65 which in turn drives a sprocket 66 that is drivably mounted onto a shaft 68. The chain 65 extends through a second side portion 67 of the upper arm assembly 44. The shaft 68 is rotatably mounted with respect to the upper arm 44 and the forearm 56 on suitable bearings 69 and is mounted for rotation on the pivotal axis of the forearm. The shaft 68 is one of the members used for joining the forearm and upper arm together.

The motor 62 can be rotated in either direction of rotation and is controlled by a suitable control element 88 located on control box 27. By use of the independently driven, concentrically mounted shafts 49, 59 and 63 the upper arm, forearm, and wrist assemblies can be pivoted about their respective axis independently and selectively.

A sprocket 70 is drivably mounted on shaft 68 inside the forearm assembly and a chain 71 is drivably mounted over the sprocket 70. The chain 71 extends through a hollow side member 72 of the forearm 56.

The chain 71 is also drivably mounted over a sprocket 73 which in turn is drivably mounted on a stub shaft 76 that is rotatably mounted as at 77 in the forearm member. The stub shaft 76 has a web 78 that is mounted onto a wrist assembly 79. The wrist assembly 79 is also rotatably mounted in the opposite side member 80 of the forearm 56 through a stub shaft 81.

When the motor 62 is powered the wrist assembly 79 is moved about the axis 82 of shaft 76, in directions as indicated by double arrow 83. The wrist is powered through chains 65 and 71 from its drive motor 62.

The upper arm or shoulder pivot, the forearm pivot, and the wrist pivot are actuated through controls 84, 85 and 88 respectively in the control box 27. In normal operation, the upper arm will pivot 250 degrees with respect to the shoulder portion, the forearm will pivot 270 degrees with respect to the upper arm and the wrist will pivot 310 degrees with respect to the forearm. The movement of the bridge and carriage at right angles to each other and the continuous rotation of the shoulder portion 42 make the manipulator very versatile and able to cover a wide area and many positions and perform a wide variety of tasks.

The brush and slip ring assembly 42A which transmits power to the motors to operate the upper arm, forearm and wrist assemblies, also transmits power from the control box 27 to a power cord 86. The power cord 86 carries wires for controlling motors in the wrist assembly and is threaded through an interior passage 90 of shaft 63; through the hollow arm member 67 of the upper arm 44; through a longitudinal opening 87 in shaft 68; out through a port 89 in shaft 68, thence down through member 80 of forearm assembly 56 and through the interior of stub shaft 81 (which is tubular) into the wrist assembly and is wired to a terminal strip 133. Power cord 86 carries electrical power to the electrically operated components in the wrist assembly.

Referring specifically to FIGS. 3A and 3B the wrist assembly 79 is shown in detail. For convenience of nomenclature, the wrist assembly will be considered to include all of the mechanism shown in FIGS. 3A and 3B. A "hand" 95 will include the portions that are removable from the wrist assembly. This includes the gripping jaws, and the gripping jaw drive. The wrist member includes the portions of the unit which are longitudinally extendable from the main wrist assembly housing.

The wrist assembly 79 includes an outer housing 96 which has a rear or upper portion 97 and a forward or lower portion 98. The two portions of the housing 96 are joined together as at 99 with suitable cap screws 100.

The wrist assembly includes a wrist member extension motor 101 which is mounted on a bracket 102 which in turn is fixedly attached to the housing 96. The motor 101 is powered through conductors leading from terminal strip 133 and cord 86 and is controlled by a suitable switch 103 in the control box 27. The wrist extension motor 101 has an integral gear box driving an output shaft 104 to which a coupling 105 is drivably attached. The coupling 105 in turn is drivably attached to a clutch face member 110 with suitable screws 111. A wrist extension screw 112 is rotatably mounted with respect to housing 96, at a first end thereof in a bearing 113 and is rotatably at a second end thereof with respect to the clutch member 110 through a bearing 114. A clutch plate 115 is drivably mounted at the second end of the screw 112 and a Belleville spring washer 116 is mounted between the clutch plate 115 and a shoulder 117 formed at the rear portion of the screw 112.

A nut 120 is threadably mounted at the second end of screw 112 and may be tightened to control the tension on Belleville spring 116. This in turn will control the torque which will be transmitted through clutch member 110 and clutch plate 115 to drive the screw 112. The clutch limits the torque which can be transmitted with motor 101.

A drive nut 121 is threadably mounted on screw 112 and in turn is fixedly attached to a wrist member housing 122. Upon powering the wrist extension motor 101 (which is a reversible motor) in a first direction by moving control element 103, the nut 121 will move in direction as indicated by arrow 123. The nut 121 will move the wrist member housing 122 in this direction. The wrist member housing 122 is slidably mounted with respect to the main housing 96 and is sealed with respect thereto with an O ring 124. When the wrist member housing extends the entire wrist member will move outwardly from the wrist assembly housing 96. The wrist member will extend until the nut 121 contacts portions of housing 96 adjacent a first end of the screw. The motor 101 can be reversed by moving control 103 in suitable direction and the wrist member will be retracted.

A hand rotation motor 128 is mounted to a bracket 129 which in turn is attached to the wrist member housing 122 with suitable screws 130. Thus the motor 128 moves longitudinally or axially with the wrist member housing.

Bracket 129 also holds a slip ring assembly 131 which will be more fully explained later.

The motor 128 is powered through an electrical cord 132 which is connected to terminal block 133 which in turn is wired through the power cord 86 to the control box. The motor 128 is controlled with a suitable rotary reversible motor switch 134. It should be noted that all of the motor switches used with the manipulator of the present invention are designed so that movement of the switch not only controls direction of rotation of the motor but speed of rotation. As the switch is turned or moved further past the neutral or "off" position the speed of the motor increases. If the direction of movement of the switch is reversed the motor slows down and if the switches moved past its neutral or "off" position the rotation of the motor is reversed. The motors are run on direct current.

The motor 128 has an output shaft 135 on which a clutch hub 136 is drivably mounted. An end plate 140 is drivably mounted to a hand housing 141 and is rotatably mounted with respect to the clutch hub 136. The clutch hub has a clutch face 142 which engages the end plate 140. The end plate 140 also acts as a clutch plate in this instance. A Belleville spring 143 is positioned against the end plate 140. A thrust bearing 144 is mounted over the clutch hub 136 and is positioned between the Belleville spring 143 and an adjustment nut 145. The adjustment nut 145 is threadably mounted as at 146 to the clutch hub and serves to adjust the amount of spring force between the clutch face 142 and the end plate 140.

The clutch hub 136 is slidably mounted on a spline on output shaft 135 of motor 128. The spring force extended by the Belleville spring 143 urges the clutch hub 136 against the inner surface of end plate 140 of the hand housing. This forms a friction slip clutch which controls the amount of torque which can be exerted by motor 128 on the hand housing.

The hand housing 141 is tubular, as shown and is rotatably mounted with respect to the wrist member housing 122 on suitable bearings 147, 147. The bearings 147, 147 are spaced apart to provide sufficient support for the hand housing and are held in place with retaining rings 150, 150. A spacer 151 is mounted over the hand housing 141 and is positioned between end plate 140 and an inner race of one of the bearings 147. The spacer 151 holds the hand housing in proper position and prevents longitudinal movement thereof. The hand housing is thus rotatably driven by motor 128 and is free to rotate with respect to the wrist member housing 122.

Referring to FIG. 7, it will be seen the slip ring assembly 131 includes a brush block 152 that is mounted on the hand housing 141 and first, second, third and fourth brushes, 153, 154, 155 and 156, respectively, are mounted on the brush block 152. The brushes 153, 154, 155 and 156 each engage a separate slip ring 157, 158, 159 and 160, respectively. Each of the slip rings is connected to a separate wire extending from terminal strip 133 to the slip ring. The slip rings are electrically connected through the terminal strip to suitable electrical wires in the power cord 86. The brushes are slidably, electrically connected to the slip rings and as the hand housing 141 rotates, electrical power is transmitted through the slip rings to the brushes.

Referring specifically to FIG. 7 it will be seen that the slip ring and brush assembly 131 is such that the brushes 153, 154, 155 and 156 ride tightly against the individual slip rings 157, 158, 159 and 160. The brushes are spring mounted and ride against the slip ring with sufficient force so that power is transmitted to the brushes and through the brush block to connected conductors 168 and 176. Power is transmitted through the brush and slip ring assembly to electrical components that rotate with the hand housing.

A grip motor 165 is mounted within the hand housing 141 and is fixedly attached with respect thereto with a bracket 166 and machine screws 167. The motor 165 is electrically connected through wire 168 to the brush block 152. Electrical power for the motor 165 is transmitted through two of the brushes and slip rings and through power cord 86. The motor 165 is controlled with a switch 169 on the control box 27. Again, the motor is reversible, and the speed of the motor is controlled by the switch 169 also.

The motor 165 has an output shaft 170 which is powered and on which a clutch hub 171 is drivably mounted. The clutch hub is part of an electro-magnetic clutch assembly illustrated at 172. The face of the clutch hub forms a clutch plate. The electro-magnetic clutch assembly has a coil housing 173 which is fixedly mounted with respect to a hand mounting member 174 that forms a forward part of the hand housing. The hand mounting member 174 is fixedly attached to the main portion of the hand housing with suitable screws 175. The mounting member 174 and the main portion 141 of the hand housing rotate as a unit. A clutch plate 178 forms the driven part of the electro-magnetic clutch. The electro-magnetic clutch is a commercial unit made by Warner Electric Company of Beloit, Wisconsin, Model FF-250. The clutch will transmit a desired amount of torque by adjustment of the magnetic field acting on the clutch plates. The clutch plate 178 and the matching face of the clutch hub 171 will slip relative to each other when a predetermined torque has been reached.

Electric current is supplied to the clutch coil through the main power cord 86, through the terminal slip 133 and then through the brush and slip ring assembly 131. Power cord 176 leads from brush block 152 to the magnetic clutch coil. The magnetic field is varied in intensity through the use of a rotary switch 177 controlling suitable potentiometer and by rotating the switch the amount of current flowing to the coil can be controlled. Thus the torque which can be transmitted with the clutch is also controlled. The switch 177 is on control box 27. The amount of force of the clutch is infinitely variable between a predetermined maximum and minimum.

A drive hub 179 is drivably attached to the plate 178 and to a grip drive nut 180, which in turn is rotatably mounted on suitable bearings 181, 181 within a grip mounting housing 182.

The grip drive nut 180 is threadably mounted on a grip actuating screw 183 which has a head member 184 at an outer end thereof. As the motor shaft 170 rotates in one of the directions indicated by double arrow 185 the grip actuating screw 183 will move in one of the directions indicated by double arrow 186. The head 184 will move with the screw. The head 184 has a pair of pins 190, 199 mounted therethrough. The pins are rotatably mounted in the head member 184 and protrude on opposite sides of the head member. Each of the pins has a flattened portion which is slidably mounted in one of the provided grooves 191 in first and second grip actuator links 192, 193, respectively.

The first actuator link 192 is also pivotally mounted about a pin 194 which extends through a pair of ears 195, 195 which are integral with the grip mounting housing. The second actuator link 193 is pivotally mounted about a pin 196 which extends through a pair of ears 197, 197 which are aligned with the ears 195, 195.

The actuator links 192 and 193 are bifurcated and the legs of each link straddle the head member 184. The outer ends 200 and 201, of the links 192, 193, respectively are also bifurcated and first and second gripping jaws 202 and 203, respectively, are pivotally mounted as at 204 and 205, respectively, to the bifurcated ends.

Each of the gripping jaws 202 and 203 has a second link 206 and 207, respectively. The link 206 is pivotally mounted as at 210 to the first gripping jaw 202 and is pivotally mounted as at 211 between ears 195, 195.

Link 207 is pivotally mounted as at 212 to second grip jaw 203 and is pivotally mounted as at 213 to ears 197, 197. The links which hold each of the grip jaws with respect to the ears 195, 195 or 197, 197 are parallel and when the head member 184 moves back and forth in direction as indicated by double arrow 195 the grip jaws are spread apart or moved together. The mating surfaces of the grip jaws illustrated at 214 remain parallel to each other throughout the travel of the jaws. In order to minimize longitudinal travel of the jaws, the pivotal centers of the links on ears 195, 195 and 197, 197 are in the center of movement of the links. In other words, the pivotal axis between the jaw and each of the links travels an equal distance on either side of a plane parallel to the gripping jaw surfaces and passing through the pivotal axis between the same link and the ears of the grip mounting housing when moved from closed to fully open position.

The head member 184 is sealed with respect to the inner surface of the grip mounting housing with a suitable flexible gasket or diaphragm 215.

The grip mounting housing 182 has an annular ring 220 which is mounted integral therewith and held with a pin 221. The ring 220 is provided with a plurality of part spherical indentations 222 which are annularly arranged around the outer periphery thereof. (See FIG. 5.) The annular ring fits within a center opening in the mounting member 174. The hand mounting member 174 is provided with three radially extending openings 223 which are annularly aligned. A separate ball 224 is rotatably mounted in each of the openings 223 for limited radial movement. A ball locking collar 225 is mounted over the grip mounting housing and is of configuration to fit over the mounting member 174. When the grip mounting housing is in position on the hand mounting member 174 the balls 224 partially enter three of the indentations 222. Collar 225 will move to position wherein an inner surface 219 of the collar will hold the balls trapped partially in the indentations and partially within the openings 223. Axial movement of the hand with respect to its mounting member is prevented and the hand will rotate and move with its mounting member. Springs 226 are provided to resiliently urge the collar 225 and the grip mounting housing 182 apart. This urges the collar to position covering the balls.

By moving the collar 225 in direction as indicated by arrow 229 the collar is moved to position wherein an annular relief surface 230 is over the balls 224. The relief surface 230 is spaced from the forward portion of the hand mounting member and when the surface 230 is over the balls there is room so that the balls can move radially outwardly in the holes 223 to position wherein they are clear of the indentations 222. The annular ring 220 can then slide past the balls and the entire hand 95 can be removed from the mounting member. The clutch plate 178 is pulled away from the clutch hub when the hand is removed. The setting of the gripping jaws is not changed when the hand is removed.

A pin 231 is mounted in the grip mounting housing 182 and extends through a slot 232 in the annular collar or sleeve 225. The pin 231 engages the edge portions of the slot 232 and prevents the collar from coming off the grip mounting housing when the hand is removed from the wrist member. The slot is of sufficient length so that the collar is movable to position wherein surface 230 is over the balls.

When the hand 95 is to be replaced on the wrist the wrist is inserted into the collar 225. The balls 224 will engage a ramp surface 233 joining surfaces 219 and 230. As seen in FIG. 5, because of the beveled corners the mounting member will slip over ring 220 and within collar 225 very easily. The balls engage ramp surface 233. Then, if either the ring 220 or the mounting member 174 are moved further toward each other the collar 225 will move with the balls against the force of springs 226. In other words, the balls 224 and the indentations 222 move toward alignment. When the indentations become aligned with the balls, the balls will move into the most closely aligned indentations under urging of ramp surface 233. Once the balls are positioned within the indentations the collar 225 will snap to position with surface 219 over the balls and locking the hand onto the mounting member under urging of springs 226.

It should be noted that the ramp surface exerts an axially inward force on the balls. The indentations 222 are closely spaced. At all relative rotational positions between the ring 220 and mounting member 174 at least a portion of the balls and their mating indentations overlap. Under the urging of ramp surface 233 the balls tend to roll into the indentations and will actually rotate the mounting member to effect perfect alignment. This makes interchanging hands and tools easy. There is a detent 222 every ten degrees of arc around the outer surface of the annular rings 222. This permits the balls to move into the detents no matter what the angular position of the grip member and the wrist is. The wrist is free to rotate to align the balls with the detents so that they can seat.

The geometry of the jaws and the grip drive is such that the jaws cannot be externally driven. Thus once something is gripped by the jaws their position cannot be changed except by using the grip drive motor to reverse their movement. Once something has been gripped it will not be dropped due to opening of the jaws.

Referring specifically to FIG. 8 it will be seen that front or lower wrist assembly housing section 98 has a raised portion 240 which houses the screw 112. An end plate 241 is placed over the screw 112. The housing 97 holds an auxiliary power receptacle 242 which can be used for remote powered equipment. The power receptacle 242 receives its current from an auxiliary power cord 243 which is connected through terminal strip 133 to the power cord 86. A switch 244 in control box 27 can be used to control the auxiliary power receptacle 242 as desired.

Referring specifically to FIG. 9, there is shown a mechanism for tightening the chains that are used for operating the upper arm, forearm and wrist assemblies. As previously explained, chains pass through the hollow members of the respective arms. As can be seen a chain slide member 236 is pivotally mounted within the hollow portion of the arm (each of the chains has one of the tighteners) adjacent the chain to be tightened. The chain and slide member is pivotally mounted as at 237 to the arm member. The slide member has an inclined portion 238 and contacts the chain as at 239. A set screw 235 is threadably mounted in the arm member and is utilized to adjust the tension with which the chain slide member 236 contacts the chain. The tightener is sealed from the exterior, and yet is easily adjusted by merely setting the set screw, which is open to the exterior. The chain can move in either direction without interfering with the slide member and the tightness of the chain is always accurately controlled.

It will be seen that no matter which way the chain is traveling there are no sharp edges or corners to catch the chain and cause damages to the mechanism.

Referring specifically to FIG. 10, there is shown a fixture for changing the manipulator hand. The fixture is comprised as a rectangular shaped box 250 having a U-shaped opening 251 at one end thereof which receives the collar 225. A pair of transversely spaced, vertically extending guide members 252 fixedly attached to the opposite end wall thereof and on the inside of the box. The U-shaped opening is adapted to receive the outer periphery of the collar 225. The guide members are spaced so they will receive and hold the end portions of the gripping jaws 202 and 203. The guide members in box 250 are of sufficient length so that the jaws can be held therebetween even if they are opened or spaced apart in a vertical direction. The change fixture box 250 is fixedly attached to some fixed base within reach of the manipulator.

When the hand is to be changed it is placed within the box as shown in FIG. 10 so that a flange 253 of collar 225 is inside the box and the jaws are between the guide members 252. The wrist member is retracted or is moved axially rearwardly away from the box. The U-shaped end member engages the flange 253 around the collar 225 and as the wrist moves further away from the fixture the sleeve will be held and the ring 220 moves rearwardly with the wrist. The ring 220 and mounting member are moved so that the balls 224 are aligned with the annular surface 230. This will permit the balls to move out of indentations 222 and the hand will separate from the hand mounting member.

When the hand has been removed other tools can be mounted on the wrist member. For example, a hook is utilized as an interchangeable fixture in place of the hand where extremely heavy loads are to be lifted or where other operations requiring a hook are carried out. While parallel operated jaws are shown throughout the specification, a hook, tongs and other implements may be used with the hand for specialized operation.

When the hand is to be replaced, the manipulator is moved so that the wrist member is substantially axially aligned with the hand. The wrist member is moved to position within the periphery of the collar 225 as shown in FIG. 5. The wrist member is then further forced toward the collar. The mounting member 174 slips over the ring 220 and the balls 224 are forced against the ramp surface 233 inside the collar 225. This will force the collar and hand toward the end panel of the change fixture box away from the U-shaped mounting. The ends of the gripping jaws will engage the end panel of the box and be prevented from axial movement. As the mounting member 174 is further axially moved with respect to the ring 220 the balls force the collar 225 to move against the action of springs 226 and the indentations 222 and balls 224 move toward alignment. When the balls become annularly aligned with the indentations they will roll into the respectively aligned indentations. If there is slight misalignment the action of the balls on the indentations will cause the mounting member 174 to rotate to seat the balls. This will permit the ramp surface 233 within the collar 225 to slide past the balls and the collar 225 will snap into place so that the inner surface 219 will hold the balls partially within holes 223 and partially within the aligned indentations 222. The hand is locked in place and ready for use.

Thus the hand can be removed and replaced with merely straight line axial motion of the wrist or wrist assembly in cooperation with the change fixture. The axial alignment is not critical as the edges of the mating members are beveled and will slide past each other. There is no need to manually move collar 225 against the pressure of spring 226 as the axial movement of the wrist in cooperation with the change fixture provides the necessary action.

Throughout the description of the invention electric motors have been used as examples for running the various manipulator components. However, in practice hydraulic, electric of pneumatic motors can be used. Similarly, pneumatic and hydraulic slip rings can be used for carrying power past the rotating joints.

It is also readily seen that the hand can be removed and replaced with the jaws fully opened, closed or in any intermediate position without affecting their position. It also can be removed with an object being gripped, if desired. The jaws and drive screw geometry are such that the jaws will not open when the hand is removed. In other words, the drive screw cannot be reversed by exerting an external force on the gripping jaws.

All of the various drives of the manipulator are protected by friction overload slip clutches and this in turn prevents accidental overloading and subsequent damage to the machine.

It is of particular importance to note that the grip drive motor for running the grip screw rotates with the wrist member so that the position of the gripping jaws is not effected by rotation of the hand. In other words, the gripping jaws are moved independently of hand rotation and can be removed from the wrist in any position desired.

What is claimed is:

1. A remotely controlled handling unit comprising a hand member, a wrist member for mounting said hand member, said hand member having a pair of gripping jaws rotationally driven, actuating means on said hand member for moving said jaws between a closed and an open position, rotating power means on said wrist member, a longitudinally disengageable rotationally drivable connection between said rotating power means and said actuating means, and releasable means retaining said hand on said wrist member.

2. A remotely controlled handling unit comprising an arm member, a wrist assembly mounted on said arm member and movable about a transverse pivot, a hand mounting member mounted adjacent one end of said wrist assembly, a hand member removably mounted on said hand mounting member, said hand member having a pair of gripping jaws movable between a closed and an open position, power means mounted on said hand mounting member, rotary actuator means connected to said gripping jaws, an electro-magnetic clutch connected between said rotary actuator means and said power means, and control means to remotely vary the amount of force that can be transmitted by said electro-magnetic clutch.

3. A remotely controlled handling unit comprising an arm member, a wrist member mounted on said arm member and movable about a transverse pivot, an elongated first member mounted on said wrist member and slidable in direction along the longitudinal axis thereof, first power means mounted on said wrist member for moving said first member along its axis, a hand member mounted on said first member, said hand member having a pair of gripping jaws movable between a closed and an open position, second power means mounted on said first member, actuator means driven by said power means and operatively connected to said gripping jaws, said jaws being actuated by said second power means, and control means for selectively operating said first and second power means.

4. A remotely controlled handling unit comprising a wrist assembly, a first member rotatably mounted with respect to said wrist assembly, a hand member removably mounted on said first member, a pair of cooperating gripping jaws on said hand and movable between a closed and an open position, first power means mounted on said first member for actuating said gripping jaws, second power means mounted on said wrist assembly and drivably connected to said first member for rotating said first member, and control means for controlling operation of said first and second power means.

5. The combination as specified in claim 4 wherein said first member is a tubular member and the hand is removably mounted to said first tubular member and means are provided for mounting said hand, said means comprising a plurality of balls mounted for radial movement through the wall of said first tubular member, said hand having a surface slidable into said tubular member and provided with part spherical indentations to receive a portion of said balls, a collar having a first inner surface adapted to cover said balls and hold them within aligned indentations in said hand surface, said collar being movable to a release position wherein said first inner surface no longer covers said balls, the direction of movement of said collar when it is moved to said release position being the same as the direction of movement of said hand when it is removed from said tubular member.

6. The combination as specified in claim 5 and a fixture for facilitating removal of said hand from said tubular member, said fixture comprising a box like structure having a pair of end walls, a first of said end walls having means provided thereon for preventing said collar from moving toward said wrist member, and a second of said walls having means thereon for preventing movement of said hand in direction toward said gripping jaws, the means on said second wall being effective only when said collar has been moved to its release position and is being retained by said means on said first wall.

7. A remotely controlled handling unit comprising a wrist assembly, a first tubular member longitudinally slidably mounted with respect to said wrist assembly, first power means for moving said first tubular member in direction along its longitudinal axis, a second tubular member rotatably mounted with respect to and within said first tubular member, a hand member mounted on said second tubular member, a pair of cooperating gripping jaws on said hand and movable between an open and a closed position, second power means mounted on said second tubular member for actuating said gripping jaws, third power means mounted on said first tubular member drivably connected to said second tubular member for rotating said second tubular member, and control means for independently selectively controlling said first, second and third power means.

8. A remote handling unit comprising an arm member, a wrist assembly pivotally mounted with respect to said arm member for pivoting about a transverse axis, means for pivoting said wrist assembly, a tubular member rotatably mounted with respect to said wrist assembly, power means on said wrist assembly for rotating said tubular member, a slip ring mounted with respect to said wrist assembly, a plurality of electrical current conducting brushes mounted with respect to said rotating member and adapted to contact said slip rings, a source of electrical power connected to said slip rings, a hand member removably attached to said tubular member and mounted for rotation with said tubular member, a pair of gripping jaws mounted on said hand member and movable between a closed and an open position, an actuator screw connected to said gripping jaws for moving said gripping jaws between said open and closed positions upon longitudinal movement of said screw, a nut rotatably mounted with respect to said hand member and threadably mounted on said screw, a first clutch plate drivably mounted on said nut, an electric motor mounted with respect to and inside said tubular member, and rotatable with said tubular member, means electrically connecting said brushes to said electric motor, said electric motor having an output shaft rotatable about substantially the same axis as said screw, a second clutch plate drivably mounted with respect to said output shaft of said motor, said second clutch plate being positioned to mate with and drive the first clutch plate, releasable means for mounting said hand to said tubular member with said first and second clutch plates in driving relationship, and separate control means for operating the arm, wrist assembly, power means and electric motor.

9. The combination as specified in claim 8 wherein said means for removably mounting said hand with respect to said tubular member comprises a plurality of balls mounted in radial holes extending through the wall of said tubular member, a cylindrical surface on said hand member in adjacent relationship to the inner surface of said tubular member, said cylindrical surface having part spherical indentations provided therein aligned with said balls with said hand in mounted position, and a sleeve slidably mounted over said tubular member and adapted to urge said balls through said radial holes to position wherein they are partially within said part spherical indentations of said cylindrical surface on said hand and partially within said radial holes and to hold said balls in this position.

10. The combination as specified in claim 9 wherein said means for pivoting said wrist assembly comprises chain drive means.

11. The combination as specified in claim 10 wherein said arm member has a tubular portion and said chain drive means extends through said tubular portion.

12. The combination as specified in claim 11 and chain tightener means comprising a slide bar pivotally mounted on said arm member and having a surface adapted to contact and slide on said chain and an externally adjustable screw threadably mounted in said arm member and engaging said slide bar between its pivot and the portion thereof in contact with said chain.

13. The combination as specified in claim 1 wherein said actuating means is immovable except by rotation and said longitudinally disengageable rotationally drivable connection is disengageable in axial direction regardless of the position of said actuating means and said gripping jaws.

14. The combination as specified in claim 1 wherein said rotationally driven actuating means includes a pair of mating threadably engaged members each of which will not move when the other one is subjected to an axial force.

15. The combination as specified in claim 5 wherein said collar has a second inner surface of greater diameter than said first surface, a ramp-like surface joining said first and said second inner surfaces, said second inner surface being over said balls with said collar in said release position and being spaced from said first tubular member a sufficient distance to permit said balls to move out of said part-spherical indentations, resilient means urging said collar to position away from said release position, the spacing of said part-spherical indentations on said hand member being sufficiently small so that when said hand is in place with the part-spherical indentations annularly alined with said balls the force exerted on said balls by said ramp-like surface will act through said balls against the surfaces defining said part-spherical indentations with a sufficient amount of rotational force to seat each of said balls in the closest part-spherical indentation.

16. A remotely controlled handling unit comprising a wrist assembly, a first member longitudinally slidably mounted on said wrist assembly and movable with said wrist assembly about the wrist assembly pivot, means for moving said first member in direction along its longitudinal axis with respect to the wrist assembly, a second member rotatably mounted with respect to and on said first member, a hand member mounted on said second member, a pair of cooperating gripping jaws on said hand member and movable between a closed and an open position, separate power means for actuating said gripping jaws, for moving first member along its longitudinal axis and for rotating said second member, and control means for independently selectively controlling said power means to effect movement of said first member, said second member, and said gripping jaws.

17. A remotely controlled handling unit comprising an arm member, a wrist member mounted on said arm member and movable about a transverse pivot, a first member mounted directly on said wrist member to be pivotally movable only with the wrist member and being slidable along its longitudinal axis with respect to the wrist member, first power means mounted on said wrist member for moving said first member in direction along its axis, a second member rotatably mounted about its longitudinal axis on said first member, a manipulator tool mounted on said second member, second power means for rotating said second member about its longitudinal axis, and separate control means for independently selectively controlling said first and second power means.

References Cited by the Examiner
UNITED STATES PATENTS

| | | |
|---|---|---|
| 2,861,701 | 11/1958 | Bergsland et al. |
| 2,959,301 | 11/1960 | Willsea. |
| 3,066,805 | 12/1962 | Sullivan. |

GERALD M. FORLENZA, *Primary Examiner.*

ERNEST A. FALLER, HUGO O. SCHULZ, *Examiners.*